United States Patent [19]
Heimprecht

[11] 3,851,160
[45] Nov. 26, 1974

[54] MEASURE VALUE METHOD AND APPARATUS

[75] Inventor: Ulrich Stefan Heimprecht, Darmstadt, Germany

[73] Assignee: Gebr. Hofmann KG, Darmstadt, Germany

[22] Filed: Sept. 20, 1973

[21] Appl. No.: 399,340

[30] Foreign Application Priority Data
Oct. 16, 1972 Germany............................ 2250717

[52] U.S. Cl...... 235/151.3, 235/151.13, 340/213 Q, 340/248 A, 340/411
[51] Int. Cl.............................................. G06g 7/16
[58] Field of Search............. 235/151.13, 151.3, 184, 235/196; 324/73 R, 73 AT, 103 R, 103 P, 115, 140 R, 140 D; 340/179, 213 Q, 411, 248 A

[56] References Cited
UNITED STATES PATENTS

| | | | |
|---|---|---|---|
| 3,151,237 | 9/1964 | Hrabak .......................... | 235/151.13 |
| 3,534,353 | 10/1970 | Calkin et al. .................. | 340/248 A |
| 3,694,635 | 9/1972 | Hoetzel et al.................. | 235/151.3 |
| 3,750,134 | 7/1973 | Weisend ...................... | 340/213 Q X |

*Primary Examiner*—Charles E. Atkinson
*Assistant Examiner*—Jerry Smith
*Attorney, Agent, or Firm*—Cushman, Darby & Cushman

[57] ABSTRACT

A method and apparatus for evaluating electrical measurement values derived from a test stand in which upper and lower tolerance values, stored for example on a punched card, are coverted into analog signals with the upper and lower value signals being applied to one difference forming circuit while the measurement value and one of the tolerance signals is applied to a second difference forming circuit. The resulting difference signals are divided, one into the other, and applied to an analog display.

5 Claims, 1 Drawing Figure

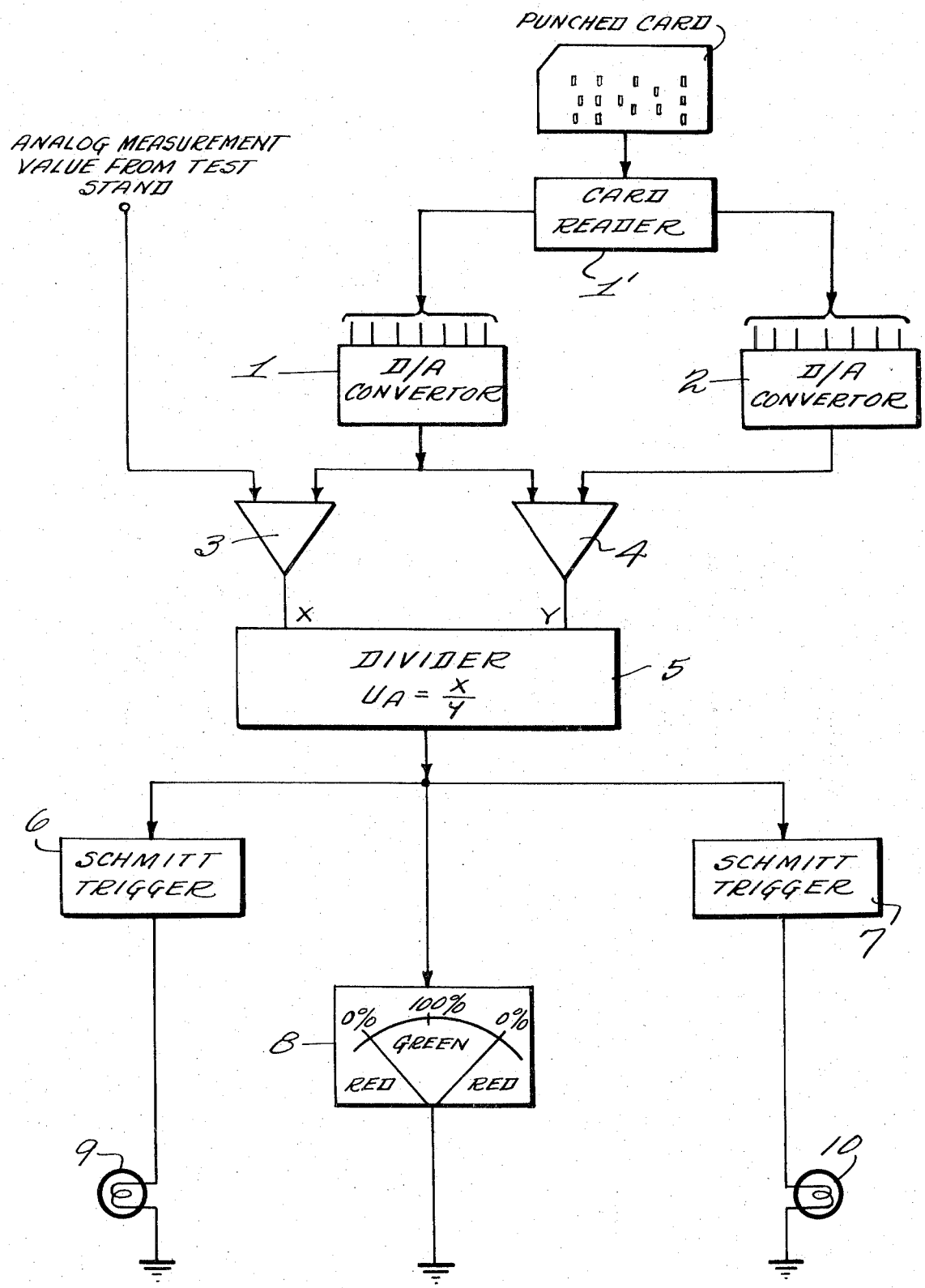

MEASURE VALUE METHOD AND APPARATUS

This invention relates to methods and apparatus for evaluating measurement values of a testing stand, for example a motor vehicle testing stand.

Such a method has been proposed in which the measurement values obtained on the stand are compared to upper and lower tolerance values which are stored in a storage medium. Evaluation of the part being tested is then effected in dependence on this comparison, and the result displayed. This method can be carried out by means of an apparatus, a so-called diagnosis apparatus, having a storage means such as a perforated card in which upper and lower limit or tolerance values in respect of the parts to be tested are stored, a comparison means for comparing the measurement or actual values to the respective tolerance values to arrive at a "good" or "bad" evaluation about the part being tested, and a display means for displaying the result of the comparison. In the case of use with motor vehicles, testing stands and such diagnosis apparatuses can be employed for example to test settings such as ignition settings or axle settings.

A disadvantage of such methods and apparatuses is that it is only possible to make an objective judgment on the condition of the part at that moment, without any prediction as to the working life or operational efficiency still to be expected. For example it is not possible to directly compare the difference which is already present between the actual value of the measurement and the ideal value, to the gap between the actual value and the tolerance limits.

According to the present invention, there is provided a method of evaluating a measurement value of a testing stand, comprising setting a measurement value in direct relation to upper and lower tolerance values, pre-stored in a storage means, comparing the measurement value to the upper and lower tolerance values and evaluating the part tested in dependence on this comparison, and displaying the result of the comparison.

The invention also provided apparatus for evaluating a measurement value in a testing stand, comprising a storage means for storing upper and lower tolerance values in respect to a part to be tested, digital-analog converter means for converting the stored tolerance values into analog values, first difference-forming means for forming a difference between the voltages corresponding to the lower and the upper tolerance values, second difference-forming means for forming a difference between the voltages corresponding to the measurement value and the lower tolerance value, the first and second difference-forming means being arranged downstream of the digital-analog converter means, a dividing means connected to the outputs of the first and second difference-forming means, and a display means connected to the dividing means for displaying the result of the comparison between the measurement value and the upper and lower tolerance values.

An embodiment of a method and apparatus according to the present invention will now be described by way of example with reference to the accompanying single FIGURE which shows a circuit diagram for the apparatus.

Upper and lower tolerance or limit digital values which are stored in the storage means, for example a punched card, and read by a conventional card reader 1', are converted into analog voltages by two digital-analog converters 1 and 2. The digital-analog converter 1 converts the lower tolerance value into the respective analog voltage and the digital-analog converter 2 converts the upper tolerance value into the respective analog voltage. The outputs of the two converters 1 and 2 are connected to a first difference-forming means such as a differential amplifier 4 in which a difference is formed between the analog voltages at the outputs of the two converters 1 and 2, which voltages correspond to the lower and the upper limit value respectively. The output of the converter 1, which corresponds to the lower tolerance value, is also connected to a second difference-forming means such as a further differential amplifier 3. Also connected to the differential amplifier 3 is a measurement circuit in a testing stand (not shown) for applying to the differential amplifier 3 in analog form the actual or measurement value obtained in respect of the part under test. A difference is formed in the differential amplifier 3 between the analog voltage at the output of the converter 1, and the analog actual or measurement value from the measurement circuit.

The output signal of the differential amplifier 4 is applied to the Y-input of a dividing means 5. Therefore, the following signals can appear at the Y-input of the dividing means 5:

| | | | |
|---|---|---|---|
| + | lower limit value | < + | upper limit value: Y-input is O ... + upper limit value. |
| + | lower limit value | > + | upper limit value: Y-input is O ... − lower limit value. |

The output signal of the amplifier 3 is applied to the X-input of the dividing means 5. Therefore the following signals can appear at the X-input of the dividing means 5:

| | | | |
|---|---|---|---|
| + | lower limit value | < + | actual value: X-input is O ... + actual value |
| + | lower limit value | > + | actual value: X-input is O ... − lower limit value. |

The dividing means 5 carries out the operation X/Y so that the following signals can appear at its output:

| | | | | |
|---|---|---|---|---|
| + | actual value | < lower limit value | < upper limit value: | $U_A$ is O ... -Umax |
| + | lower limit value | < actual value | < + upper limit value: | $U_A$ is O ... + 1 |
| + | lower limit value | < + upper limit value | < + actual value: | $U_A$ is + 1 ... + Umax. |

Connected downstream of the dividing means 5 is a display means in the form of an analog display 8, for delivering an indication of the test value tendency. By forming the difference between the voltages corresponding to the upper and the lower tolerance values, the sensitivity of the analog display can be controlled. A clear display can be achieved for the analog display by virtue of the fact that the nought level coincides with the marking for the lower tolerance value and the one level coincides with the marking for the upper limit value. The area between the nought level and the one level can be filled in with a green color. A linear scale division of 0 . . . 100 . . . 0 percent is provided between the nought level and the one level on the scale marking. A pointer (not shown) of the analog display 8 gives a percentage value which corresponds to the actual value of the measurement established on the testing stand. This establishes a direct and easily read relation between the actual value of the measurement, and the ideal value which lies at 100 percent on the scale marking, and also the two tolerance values which lie at 0 percent at the respective ends of the scale. With this arrangement for example, the left-hand 0 percent value can correspond to the lower tolerance value and the right-hand 0 percent value can correspond to the upper tolerance value.

The apparatus can also have two display lamps 9 and 10 for also giving an additional optical display to indicate whether the actual value goes beyond the lower or upper tolerance values respectively. The scale of the analog display 8 can have red areas on respective sides of the two 0 percent markings to indicate that the actual value is outside the range between the upper and lower tolerance values. For cutting in the display lamps 9 and 10 there are two Schmitt triggers 6 and 7 which switch at the nought level and the one level respectively of the analog display 8.

The above-described method and apparatus provide the advantage that, besides qualitative evaluation by a "good-bad" indication, a quantitative indication can be made as to the extent to which the actual or measurement value has deviated from the ideal value, which makes it possible to make a prediction as to the functional efficiency still present in the part being tested. In particular an indication can be made as to the extent to which functional efficiency of the part deviates from the ideal value or approaches the limit values, for example due to wear.

With a series of motor vehicle parts to be tested, this information makes it possible to arrive at conclusions concerning the probable future working life or operational life without subjective data comparison and complicated calculations. In the case of adjustment work, the display, at the analog display 8, of the tendency of the test measurement value, can be of advantage as, during adjustment operations, the work personnel only has to carry out adjustments on the tested part, in such a way that the pointer displaying the tendency of the test value on the analog display 8 comes to lie at the 100 percent marking, which corresponds to the ideal value. Repair work can be substantially facilitated thereby, since the personnel do not have to read complex data sheets or measurement values.

Many changes and modifications in the above-described embodiment of the invention can, of course, be carried out without departing from the scope thereof. Accordingly, that scope is intended to be limited only by the scope of the appended claims.

What is claimed is:

1. Apparatus for evaluating a measurement value in a testing stand, comprising storage means for storing upper and lower tolerance values in respect to a part to be tested, digital-analog converter means for converting the stored tolerance values into analog signals, first difference-forming means for forming a difference between the signals corresponding to the lower and the upper tolerance values, second difference-forming means for forming a difference between the signals corresponding to the measurement value and one of the tolerance values, the first and second difference-forming means being connected to receive the output signals of the digital-analog converter means, dividing means connected to the outputs of the first and second difference-forming means, and display means connected to the dividing means for displaying the result of the comparison between the measurement value and the upper and lower tolerance values.

2. Apparatus according to claim 1 wherein the display means is an analog display, the arrangement being such that the analog nought value is brought into coincidence with the lower tolerance value and the analog one value is brought into coincidence with the upper tolerance value.

3. Apparatus according to claim 2 wherein the analog display has a scale division of 0% . . . 100% . . . 0% between the analog nought value and the analog one value.

4. Apparatus according to claim 1 also including two display lamps operable to indicate if the measurement value goes outside the range of values between the lower and the upper tolerance values.

5. Apparatus according to claim 1 in which said second means forms a difference between the lower tolerance value and the measurement value.

* * * * *